United States Patent [19]

Emrich et al.

[11] Patent Number: 4,605,578
[45] Date of Patent: Aug. 12, 1986

[54] METHOD AND APPARATUS FOR CONNECTING TOGETHER MATERIAL PLIES WHICH ARE UNILATERALLY THERMOPLASTICALLY COATED

[75] Inventors: Reinhard Emrich, Kaiserslautern; Kurt Appel, Reichenbach-Steegen, both of Fed. Rep. of Germany

[73] Assignee: Pfaff Industriemaschinen GmbH, Fed. Rep. of Germany

[21] Appl. No.: 648,697

[22] Filed: Sep. 7, 1984

Related U.S. Application Data

[62] Division of Ser. No. 611,411, May 17, 1984, abandoned.

[30] Foreign Application Priority Data

May 20, 1983 [DE] Fed. Rep. of Germany ....... 3318471

[51] Int. Cl.$^4$ .......................... B32B 3/04; B32B 3/06; B32B 7/10; B32B 7/14
[52] U.S. Cl. .................... 428/57; 156/73.4; 156/157; 156/216; 156/275.1; 156/275.3; 156/308.4; 156/324.4; 428/190; 428/191; 428/200; 428/286
[58] Field of Search ................. 428/57, 190, 191, 200, 428/286; 156/157, 275.1, 308.4, 324.4, 216, 275.3

[56] References Cited

U.S. PATENT DOCUMENTS 3,172,798  3/1965  Rosenbaum .......................... 156/380
3,695,971  10/1972  Corning .............................. 156/775

Primary Examiner—James C. Cannon
Attorney, Agent, or Firm—McGlew and Tuttle

[57] ABSTRACT

A method of interconnecting first and second material plies, each having one side coated with a thermoplastic material uses pressing means in the form of continuously rotatable pressing rollers and heating means in the form of a heating gas. The marginal edge portion of an uncoated side of the first ply is folded back upon itself to form a pocket along its edge and after a strip of thermoplastic material or a strip having thermoplastic coating on each side is folded lengthwise, it is inserted into the pocket. The marginal edge portion of a thermoplastically coated face of the second ply is then positioned over the folded-over marginal edge portion of the first ply. Thermoplastic material between the folded-over portion of the first ply and the marginal portion of the second ply and between the folded portions of the strip are then heated so that they become thermoplastic and they are pressed together to press the portions to be bonded together. The invention also includes an apparatus for guiding the first ply so that its edge may be folded back upon itself to form the pocket and the firm thermoplastic strip which is first folded is directed into the pocket and guided so that its upper leg portion is positioned within the edge of the lower leg portion and the folded over pocket is guided by a curved extension of the guide so as to facilitate the continuous insertion of a lengthwise folded strip of thermoplastic material into the pocket. The second ply is applied over the folded portion of the first ply and it overlaps the lower leg of the folded-over strip of thermoplastic material. Heating is accomplished by means of gas heating nozzles which are directed between the portions of the folded-over strip and between the folded-over portion of the first ply and the second ply. The location before these plies are directed between rotating pressing rollers.

4 Claims, 3 Drawing Figures

METHOD AND APPARATUS FOR CONNECTING TOGETHER MATERIAL PLIES WHICH ARE UNILATERALLY THERMOPLASTICALLY COATED

This is a division of application Ser. No. 611,411 filed May 17, 1984, now abandoned.

BACKGROUND OF THE INVENTION

Field of the Invention

This invention relates, in general, to material fastening methods and, in particular, to a new and useful method and apparatus for connecting together material plies which are unilaterally coated with a thermoplastic material.

Water-proof articles of clothing for bad weather conditions, work- or sporting activity, are usually made of substrate tissues unilaterally coated with a thermoplastic material, so that the material does not harm the user's skin, especially preventing water condensation inside the clothing. In the manufacture of water-proofed canvass for tents or other protection, cost considerations are the reason for employing such coated tissues.

Several methods are known for connecting to each other coated tissue plies during manufacture.

First, the connection by sewing. A sewn seam does provide a firm and durable connection, however, the greatest advantage of the coated tissue, namely the absolute waterproofness, is lost and the seam must subsequently be sealed in a time-consuming operation hardly satisfactory in its effect, for example covered with a hot-sealed strip.

Another connection is by hot-wedge high-frequency or hot-gas sealing, by which the coated sides of the materials are bonded to each other. Even though this is a continuous process, it is relatively seldom applied, since the strength of the bond is limited to the adhesion of the coating to the underlying tissue and the requirements in the various applications are mostly stricter. Moreover, in this kind of connection, the cut edges of the tissue plies are not secured against fraying.

In another method disclosed in U.S. Pat. No. 3,172,798 a connection is produced by first sewing together the two tissue plies and a thermoplastic strip, superposed in this order, and then folding the upper ply about the thermoplastic strip back through 180°, so that the strip comes to extend within the fold thus formed. Thereupon, the superposed layers are heat-sealed to each other in a high-frequency welding process. In this process, the work must be positioned and heat-sealed by sections. The operation thus is cyclical and rather time-consuming. In addition, heat-sealing of certain curved portions either requires a change of tools, or permits only relatively short tools. Since under high loads, the thread works in the perforations made by the needle, leaks may occur in spite of the high-frequency sealing.

Finally, a method is known from German AS No. 20 33 830 providing inserting a strip of thermoplastic material between the overlapping marginal portions to be connected to each other of two coated material plies, so as to protrude on both sides beyond the two end edges of the plies, and sewing the plies and the strip with one or more seams together. One or both of the protruding edge portions of the strip are then doubled back over the adjacent end edges of the sewn composite structure and hot-sealed by high frequency welding to the respective coated ply or plies.

The connection obtained with this prior art method is of good quality and may certainly be durable, however, it is not suitable for articles such as of clothing because it produces considerably thickened portions in the material webs, which are not sufficiently flexible and supple.

SUMMARY OF THE INVENTION

The invention is directed to a method of producing particularly durable flat, water-proof connections in a continuous way with a relatively high speed of advance.

With the inventive method, the perforations of the material plies caused by sewing can be avoided. This eliminates the disadvantages related to sewing, and makes sure that all the layers applied to each other will be bonded together with a uniform strength equalling that obtained by the hot-sealing and sewing. The connection is also well resistant to cleaning operations which particularly meets requirements imposed on articles of clothing made of coated materials. Another advantage is that no peeling affects this kind of connection, which results in an increased tensional strength as compared to prior art so-called peeling seams. These are seams which have been produced by hot-sealing together material plies placed by their coated sides onto each other.

Accordingly, it is an object of the invention to provide an improved method of interconnecting first and second material plies each of which has one side coated with a thermoplastic material which comprises folding over a marginal edge portion of the uncoated side of the first ply to form a pocket along the edge, folding a strip having a thermoplastic on each face lengthwise and inserting it into the pocket, applying a marginal portion of the thermoplastically coated face of the second ply over the folded-over marginal edge portion of the first ply, heating the thermoplastic material between the folded-over portion of the first ply and the marginal portion of the second ply and between the folded-over portion of the strip, and thereafter pressing the heated portions together to bond them together.

A further object of the invention is to provide an apparatus for facilitating the formation of an interconnection between plies of material which have a thermoplastic coating on one side.

A further object of the invention is to provide an apparatus for effecting the bonding of two plies of material together which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENTS

Figure 1:
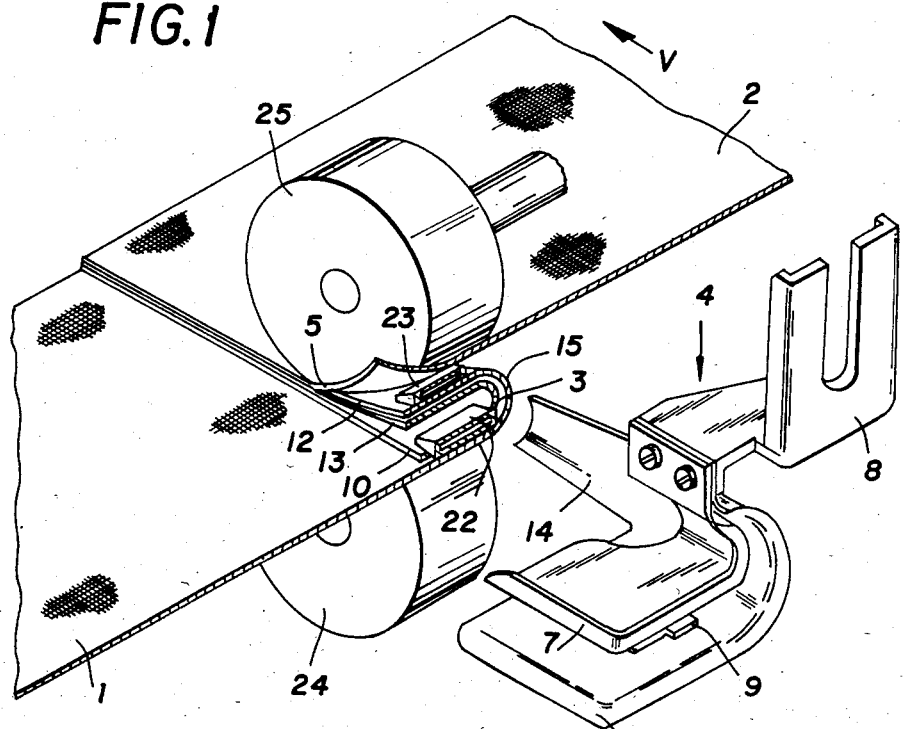
FIG. 1 is a simplified top perspective view showing the mutual position of the elements to be connected to each other and the folder, the heating nozzles and the pressure rollers.
Figure 2:
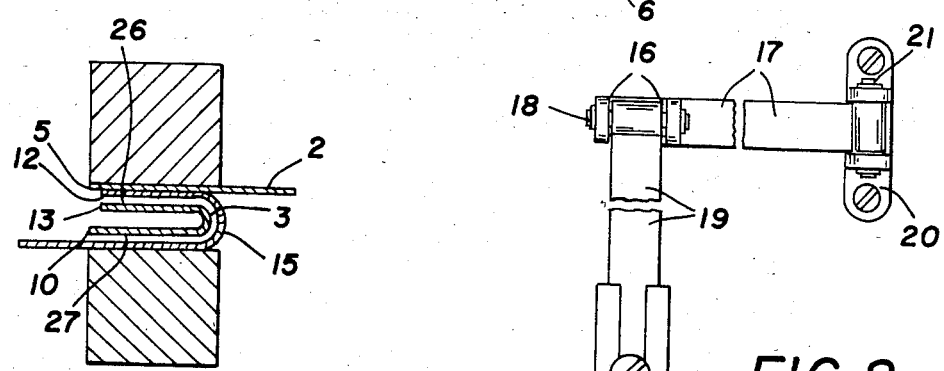
FIG. 2 is a side view of the folder supported by a hinged structure.
Figure 3:
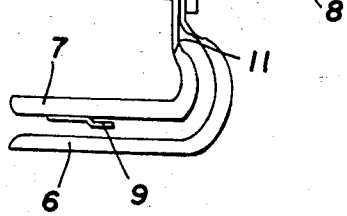
FIG. 3 is a sectional view of the material plies and the plastic strip which are to be connected to each other.

Referring to the drawings, in particular, the invention embodied therein comprises a method of interconnecting a first ply of material 1 which is coated on one side, for example, its underside, with a second ply of material which is coated on one side, for example, its underside. With the method of the invention, a marginal edge portion of the uncoated side of the first ply 1 is folded over upon itself to form a pocket along this edge. The back of the folded-over edge is designated 15. A strip 3 of the thermoplastic material or material having a thermoplastic coating on each face is folded lengthwise and inserted into the pocket. The marginal edge portion of the second ply 2 is positioned so that its coated face engages over the folded-over marginal edge portion of the first ply. Heat is applied to the thermoplastic material, preferably by a nozzle 22 and a nozzle 23 which effects directing air between the portions of the folded-over strip 3 and between the second ply and the folded-over portion of the first ply so as to heat the thermoplastic material to a thermoplastic condition as the plies with the strip are fed between pressing rollers 24 and 25 which are rotated to aid in the feeding thereof.

Each of the two material plies 1 and 2 to be connected to each other is unilaterally coated with a layer of thermoplastic material. The supporting tissue of the plies may be made of synthetic or natural fiber threads of any weave (linen, twill, etc.). The coating may have been produced by any prior art method, and comprises a polyurethane, polyvinylchloride, or other thermoplastic. A coating strip 3 of plastic or a coating of plastic for connecting materials 1 and 2 together should be of the same, or a very similar, thermoplastic material as the coating. In the present example, a plastic strip is provided which is coated on one of its sides with an adhesive capable of being reactivated by heating, to obtain a better bond to the substrate tissue.

To effect the hot or heat-sealing, any of the prior art methods can be used in practice. However, in the inventive method, a hot-wedge and hot air or hot-gas welding process is to be preferred over the high frequency welding process, because of the smoother and faster operation.

As the auxiliary equipment for folding and guiding the first material ply 1 and the plastic strip 3, a folder generally designated 4 is provided and an edge guide (not shown) for guiding the end edge 5 of second material ply 2.

The folder 4 for folding the marginal portion of first material ply 1 comprises two deflector plates 6 and 7 which are secured to a supporting arm 8. To the inner surface of deflector sheet 7, an edge guide 9 is secured, for example by soldering, to be engaged by one of the edges 10 of a strip 3 having a plastic face on each side or made completely of plastic. In its upper portion, deflector sheet 7 is formed with an edge guide 11 which is a common guide for an edge 12 of a folded marginal portion of the first material ply 1 and the other edge 13 of plastic strip 3. The left-hand side and the infeed side of deflector plates 6 and 7 are bent out, to simplify the introduction of the materials. Lower deflector plate 6 is provided with an extension 14 projecting in the advance direction, shown by arrow V, forming a guide for the folded back part 15 of the material ply 1. To facilitate the introduction and withdrawal of material plies 1 and 2 and the plastic strip 3, folder 4 is partially hinged to a horizontal arm 17 through a vertical arm 19 and a bolt 18 which is supported within eyelets 16, 16. Horizontal arm 17 in turn is hinged through a bolt 21 on a bracket 20 secured to the machine housing.

To heat the layers to be bonded to each other, two heating elements 22 and 23 are provided which, in the present example, are designed as prior art hot gas or hot air nozzles. One of the nozzles 22 is put in place in the interior of lengthwise folded plastic strip 3 which is introduced into the fold of first material ply 1, and the other nozzle 23 is positioned between the coated side of second material ply 2 and the coated side of the folded marginal portion of first material ply 1. Hot gas nozzles 22 and 23 communicate through a hollow shaft with a hot air blower (not shown) and may be secured to a carrier which is movable between a working and a rest position.

Heating elements 22 and 23 are followed in the advance direction V by a pair of rotatably driven pressure rollers 24, 25 by which the zones to be bonded to each other by an adhesive or by hot-sealing, are firmly compressed and continuously advanced in the direction V.

The operation is as follows:

First, marginal portion of first material ply 1 is introduced with its tissue (non-plastic) side up between deflector plates 6 and 7 of folder 4 and thus it is formed to a laterally open U-shaped fold having the tissue side inside, with end edge 12 of the first material ply 1 applying against edge guide 11 and back 15 of the fold of ply 1 applying against extension 14 of deflector plate 6. Thereupon the plastic strip 3 is introduced into folder 4 between the legs of the fold, so as to have an adhesive-coated side turned toward ply 1 and to have its edge 13 abut against edge guide 11 of the deflector plate 7, and engage by its other edge 10 into the fork-like edge guide 9 on deflector sheet 7 and apply against the inner edge thereof. The plastic strip 3 is folded lengthwise to a laterally open U having unequally long legs 26 and 27. Lower leg 27 projects some millimeters beyond end edge 12 of folded ply 1.

The second material ply 2 is then introduced, with its end edge 5 in register with end edge 12 and with its coated side down, over the folded margin of the ply 1. Hot gas nozzle 23 is brought into position between ply 2 and the folded margin of ply 1, and hot gas nozzle 22 is brought into position between legs 26 and 27 of lengthwise folded strip 3. By the hot gas flowing out of nozzle 23, the plastic coatings of the margin of ply 2 and the folded margin of ply 1 are plasticized, and by the hot gas from nozzle 22, strip 3 is plasticized from its inside and its layer of adhesive is reactivated. Next, the coatings made plastic are firmly compressed by the driven, spring-loaded rollers 24, 25 and allowed to cool down. A water-proof, highly loadable and intimate connection between the opposite layers is thereby produced in a single, continuous operation.

While a specific embodiment of the invention has been shown and described in detail to illustrate the application of the principles of the invention, it will be understood that the invention may be embodied otherwise without departing from such principles.

What is claimed is:

1. A fabric material connection for clothing comprising a first ply having a bottom which is coated with a thermoplastic and being folded along one edge upon itself to form a pocket, a thermoplastic strip folded lengthwise to form two leg portions and positioned in said pocket and a second ply having an edge portion overlying the folded-over portion of the first ply which is coated with a thermoplastic material on its overlying portion and is heat-sealed to said folded-over portion of said second ply and said strip and said folded-over portion are heat-sealed to the underlying portion of said first ply, said two leg portions of said strip being in direct contact with each other and heat sealed to each other.

2. A fabric material connection, according to claim 1, wherein said strip is provided with a longer leg portion and a shorter leg portion, the longer leg portion underlying said shorter leg portion and being bonded to the second ply.

3. A fabric material connection, according to claim 2, including thermoplastic strip having leg portions substantially equal to the folded-over portion of said first ply, being thermoplastically heat-sealed between said folded-over portions of said first ply and including a portion extending beyond said folded-over portions being heat-sealed to said second ply.

4. A fabric material connection for clothing consisting essentially of a first ply having a bottom which is coated with a thermoplastic and being folded along one edge upon itself to form a pocket, a thermoplastic strip folded lengthwise and positioned in said pocket and a second ply having an edge portion overlying the folded-over portion of the first ply which is coated with a thermoplastic material on its overlying portion and is heat-sealed to said folded-over portion of said second ply and said strip and said folded-over portion are heat-sealed to the underlying portion of said first ply.

* * * * *